UNITED STATES PATENT OFFICE 2,673,197

BASIC DIAZOAMINOBENZENE COMPOUNDS

Heinrich Jensch, Frankfurt am Main Hochst, Germany, assignor to Farbwerke Hoechst Aktiengesellschaft vormals Meister Lucius und Brüning, Frankfurt am Main Hochst, Germany, a company of Germany No Drawing. Application May 15, 1952, Serial No. 288,033

Claims priority, application Germany May 21, 1951

6 Claims. (Cl. 260—140)

This invention provides basic diazoaminobenzene compounds of the general formula

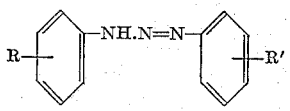

in which R and R' each represent one of the groups

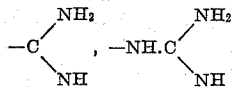

and

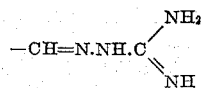

I have found that the aforesaid basic diazoaminobenzene compounds, capable of forming stable salts, are very active against blood parasites, for example, trypanosomes, babesia and the like. This is unexpected, because it is known that, for instance, para:para'-diamidino-azobenzene of the formula

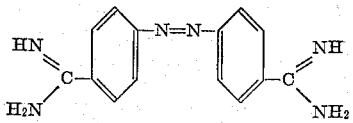

is entirely inactive against trypanosomes (Journal of the Chemical Society (London), 1942, page 106).

The aforesaid diazoaminobenzene compounds are made by reacting a diazo-benzene compound of which the phenyl radical contains as a substituent one of the groups

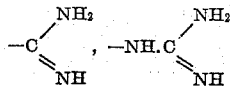

and

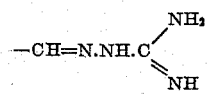

with an aniline of which the phenyl radical also contains as a substituent one of the aforesaid groups.

As starting material for the above reaction there may be used salts and especially the hydrochlorides of the following bases: para-aminobenzamidine, meta - aminobenzamidine, para-aminophenyl - guanidine, meta - aminophenyl-guanidine, para - aminobenzal-amino-guanidine and meta-aminobenzal-aminoguanidine.

The process is advantageously carried out by diazotizing the starting compound, and coupling the resulting diazonium salt with an aniline compound which contains one of the above mentioned groups in the meta- or para-position.

If the starting compound is the same as the aniline compound to be used for coupling, the reaction is preferably carried out by diazotizing only about half of the starting compound, and then adjusting the pH value of the reaction mixture to about 3–7 so that the resulting diazonium salt couples with the unreacted amine to form the diazoamino-compound.

The coupling is preferably carried out in a weakly acid solution, especially in an acetic acid solution.

The smooth formation of these diazoaminocompounds could not be foreseen as it is known, on the one hand, that the guanyl group is capable of coupling with diazonium compounds (Berichte der deutschen chemischen Gesellschaft, vol. 22, page 1609), and, on the other hand, that benzalaminoguanidine couples with diazonium compounds with formation of guanazyl compounds (Berichte der deutschen chemischen Gesellschaft, vol. 30, page 446).

An alternative process for making the compounds of the invention consists in converting a suitable nuclear substituent present in each of the phenyl radicals of a diazoaminobenzene compound into one of the above mentioned groups, for example, by reacting a diazoaminobenzene compound of which the phenyl radicals each contain as a substituent an aldehyde group with amino-guanidine or a salt thereof.

The following examples serve to illustrate the invention, but they are not intended to limit it thereto.

Example 1

Preparation of the compound of the formula:

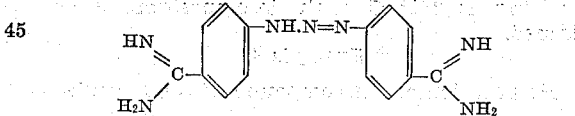

A solution of 27 grams of para-amino-benzamidine hydrochloride in 120 cc. of water is acidified with 39 cc. of concentrated hydrochloric acid, whereupon a fine magma of the dihydrochloride precipitates. To this magma there is added slowly, while stirring, a solution of 5.3 grams of sodium nitrite, and then 150 cc. of a saturated solution of sodium acetate. After a short time a yellow magma forms, which, after having been allowed to stand for some time, is filtered off with suction and washed first with dilute sodium chloride solution and finally with ice-cold water.

After drying the dihydrochloride of the base of the above formula is obtained in the form of a golden yellow powder which dissolves readily in warm water to give a yellow solution, but is only moderately soluble in cold water, especially in the presence of chlorine ions. Its solutions are stable at ordinary temperature for a long time. After recrystallization from aqueous methanol with subsequent addition of acetone, the salt melts at 270° C. with decomposition. The light red base, which is only slightly soluble in water, is precipitated from a solution of the salt by caustic soda solution. After recrystallization from methanol it melts at 210° C. with decomposition. The base forms a stable acetate which dissolves readily in water and melts at 246° C. with decomposition. Its aqueous solutions are stable for an unlimited time.

*Example 2*

To a solution of 9 grams of para-amiobenz-amidine hydrochloride in 20 cc. of water there are added first 12.5 cc. of 2N-hydrochloric acid, and then, while cooling, a solution of 1.75 grams of sodium nitrite in 5 cc. of water. The solution having a pH of about 7 turns deep dark red and, after a short time, solidifies to a stiff, light yellow magma which is isolated as described in Example 1. This product is identical with that of Example 1.

*Example 3*

Preparation of the compound of the formula

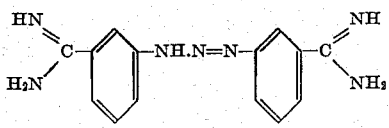

A solution of 22.5 grams of meta-aminobenzamidine dihydrochloride in 100 cc. of 2N-hydrochloric acid is diazotized with a solution of 3.6 grams of sodium nitrite. 100 cc. of saturated sodium acetate solution are then added slowly. After having been allowed to stand for some time, the precipitated di-hydrochloride of the above base is filtered off with suction, washed first with dilute sodium chloride solution and then carefully with ice-cold water. After drying, a pale yellow powder is obtained which dissolves readily in water and in methanol. It crystallizes from the methanolic solution upon addition of acetone. It melts at 190° C. with decomposition. Caustic soda solution precipitates the yellow base melting at 199° C. with decomposition. Its acetic acid salt precipitates from a solution of the base in methanol and glacial acetic acid on the addition of acetone. After recrystallization from methanol and acetone a colorless, crystalline powder, melting at 232° C. with decomposition, is obtained.

*Example 4*

Preparation of the compound of the formula

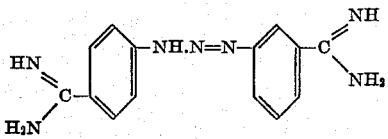

A diazonium salt solution, prepared from 12 grams of para-aminobenzamidine hydrochloride in 60 cc. of water and 17 cc. of concentrated hydrochloric acid and 4.7 grams of sodium nitrite, is mixed with a solution of 15.5 grams of meta-aminobenzamidine di-hydrochloride in 40 cc. of water. 85 cc. of saturated sodium acetate solution are added to the mixture. After allowing the mixture to stand for some time in ice, the resulting precipitate is filtered off with suction, and washed with a dilute solution of sodium chloride and ice-cold water. It is then dissolved in warm methanol with the addition of a little water, and acetone is added to the solution. The di-hydrochloride of the above compound, when it crystallizes out, is a pale yellowish grey powder which decomposes at 262° C., and dissolves readily in water with the aid of heat to form a yellow solution.

The orange colored base melts at 165° C.–166° C. with decomposition.

*Example 5*

Preparation of the compound of the formula

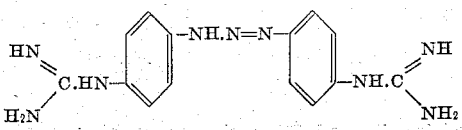

12 grams of para-acetylaminophenyl-guanidine carbonate are hydrolyzed with 80 cc. of water and 20 cc. of concentrated hydrochloric acid by heating for about one hour on the steam bath. 1.75 grams of sodium nitrite are added to bring about diazotization. To the reaction mixture are then added 40 cc. of saturated sodium chloride solution and, while stirring and cooling with ice, 24 grams of finely powdered crystalline sodium acetate. After standing for a long time in ice, the brownish yellow precipitate that has separated is filtered off with suction and washed with dilute sodium chloride solution, a little ice-cold water and acetone. The di-hydrochloride so obtained, after recrystallization from a little water, melts at 218° C.–219° C. with decomposition. By stirring it with warm dilute sodium carbonate solution it is converted to its carbonate (golden yellow powder melting at 170° C.–171° C. with decomposition). When reacted with an excess of dilute caustic soda solution the base of the above formula is obtained melting at 204° C. with decomposition. If glacial acetic acid is added to the carbonate in methanol until the mixture has an acid reaction dissolution takes place with evolution of $CO_2$ gas. On the addition of ether, the oily acetate separates, which gradually solidifies to form a light grey yellowish powder when digested with acetone. It is easily soluble in water.

*Example 6*

Preparation of the compound of the formula

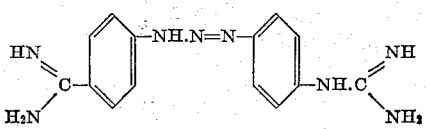

12.5 grams of para-acetylaminophenyl-guanidine carbonate are hydrolyzed as described in Example 5, and then diazotized with 3.5 grams of sodium nitrite. After admixture with 9 grams of para-aminobenzamidine hydrochloride in 25 cc. of water and the addition of 30 cc. of saturated sodium acetate solution and a small quantity of saturated sodium chloride solution the di-hydrochloride of the above compound separates after standing for some time in a refrigerator. When washed with dilute sodium chloride solution, ice water, and acetone a light yellow powder is obtained. After recrystallization from methanol and acetone it melts at 196° C. with decomposition.

Example 7

Preparation of the compound of the formula

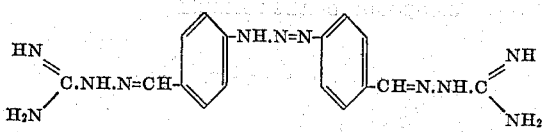

25.7 grams of para-aminobenzal-aminoguanidine carbonate in 100 cc. of water and 35 cc. of concentrated hydrochloric acid are diazotized with 3.5 grams of sodium nitrite. 100 cc. of saturated sodium acetate solution are added, and the mixture is allowed to stand for some time in ice. The precipitated brown-yellow di-hydrochloride of the above compound is isolated as described in Example 6. It dissolves readily in water with slight heating. After recrystallization from methanol and a little water with subsequent addition of acetone, it melts at 204° C.–205° C. with decomposition. Caustic soda solution precipitates the brown-yellow base which, after recrystallization from aqueous methanol, melts at 198° C. with decomposition. The acetate melts at 193° C. with decomposition.

Example 8

Preparation of the compound of the formula

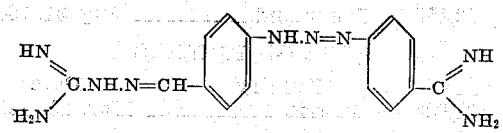

A mixture of a diazotized solution of 12 grams of para-aminobenzamidine hydrochloride in 60 cc. of water and 18 cc. of concentrated hydrochloric acid with a solution of 17.5 grams of para-aminobenzal-aminoguanidine carbonate in 35 cc. of 2N-hydrochloric acid is mixed with 35 cc. of saturated sodium acetate solution and saturated sodium chloride solution. The orange-yellow, voluminous di-hydrochloride of the above compound separates. It dissolves readily in water to give a yellow-red solution. When a solution thereof in methanol is boiled the compound separates in a form which is sparingly soluble in methanol. After recrystallization from methanol and acetone, it melts at 219° C.–220° C. with decomposition. An excess of a strong solution of caustic soda precipitates the base as a light brown-red powder which is only slightly soluble in water and melts at 208° C. with decomposition.

Example 9

Preparation of the compound of the formula

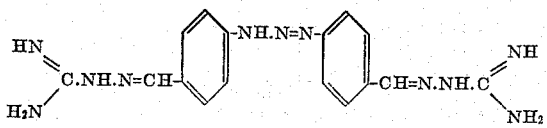

6.2 grams of diazonaminobenzaldehyde (J. pr. Chem. vol. 56, page 118) in 40 cc. of methanol are stirred thoroughly at about 30° C. with a solution of 7 grams of aminoguanidine nitrate in 35 cc. of water after the addition of one or two drops of 2N-hydrochloric acid. The mixture is allowed to stand for 12 hours at room temperature, and is then rendered slightly alkaline with sodium carbonate solution. The methanol is evaporated on the steam bath. The mixture is then diluted with water, and rendered alkaline to phenolphthalein with caustic soda solution. The brown-yellow base is filtered off with suction and washed with water. After repeated recrystallization from aqueous methanol, the yellow product melts at 197° C.–198° C. with decomposition. The acetate thereof melts at 195° C. with decomposition. The compound is identical with that described in Example 7.

Example 10

Preparation of the compound of the formula

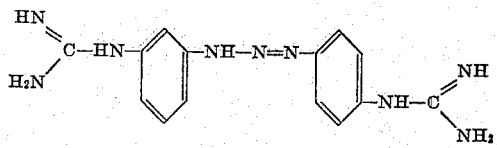

25 grams of meta-acetylaminophenyl-guanidine carbonate (M. P. 118° C.), which can be prepared from meta-aminoacetanilide hydrochloride and cyanamide, are hydrolyzed by heating for one hour with 160 cc. of water and 40 cc. of concentrated hydrochloric acid on the steam bath. The resulting solution of the hydrochloride of meta-amino-phenylguanidine is diazotized with 7 grams of sodium nitrite, and mixed with a solution of the hydrochloride of para-aminophenylguanidine which is prepared from 25 grams of para-acetylamino-phenyl-guanidine carbonate as described in Example 5. On the addition of an excess of saturated sodium chloride solution and about 100 cc. of saturated sodium acetate solution to the ice-cold mixture, a loam-yellow magma precipitates which is filtered off with suction after some time, and washed with a dilute sodium chloride solution, a little ice-cold water, and acetone. After recrystallization from methanol and acetone a yellow powder, the dihydrochloride of meta:para'-diguanido-diazo-amino-benzene, is obtained. It melts at 185° C. with decomposition and is easily soluble in water. By treating it with sodium carbonate solution a resinous carbonate is obtained which solidifies when rubbed. After recrystallization from water it is a grey-yellow powder melting at 149° C.–150° C. with slow decomposition.

Example 11

Preparation of the compound of the formula

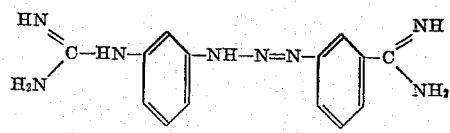

A solution of 23 grams of meta-aminobenzamidine dihydrochloride in a diazonium salt solution prepared as described in Example 10 from 25 grams of meta-acetylaminophenyl-guanidine carbonate is mixed, while cooling with ice, with about 100 cc. of a saturated sodium acetate solution and a considerable quantity of saturated sodium chloride solution. The yellowish, very voluminous dihydrochloride of the meta-quanido-meta'-guanyl-diazoaminobenzene precipitates gradually. It is filtered off with suction and washed with dilute sodium chloride solution. By stirring with sodium carbonate solution it is converted into its grey-yellow carbonate which, after recrystallization from water, melts at 94° C. with decomposition. On being acidified in methanol with glacial acetic acid it dissolves with the evolution of carbon dioxide. On the addition of ether the acetate of the meta-guanido - meta' - guanyl - diazoaminobenzene is precipitated, and it solidifies when stirred with acetone. By recrystallization from methanol and acetone a pale yellow powder is obtained which melts at 173° C. with decomposition. It dissolves readily in water to give a golden yellow solution. Caustic soda solution precipitates the brown-red base which gradually solidifies when triturated with water.

I claim:
1. Compounds of the general formula

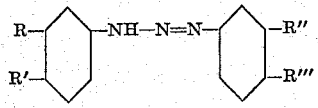

wherein one member of the pair R and R' and one member of the pair R'' and R''' is selected from the group consisting of

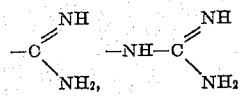

and

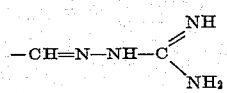

the other member of each pair being hydrogen.

2. A compound of the formula

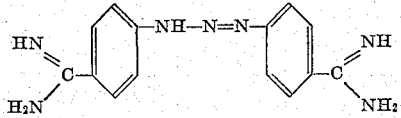

3. A compound of the formula

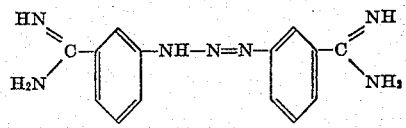

4. A compound of the formula

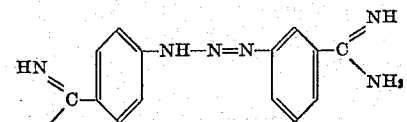

5. A compound of the formula

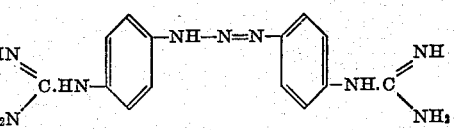

6. A compound of the formula

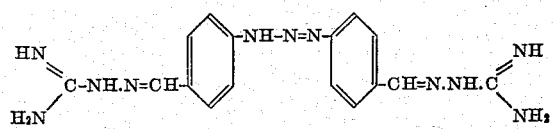

HEINRICH JENSCH.

References Cited in the file of this patent

UNITED STATES PATENTS

| Number | Name | Date |
|---|---|---|
| 2,448,155 | Richmond | Aug. 31, 1948 |

FOREIGN PATENTS

| Number | Country | Date |
|---|---|---|
| 121,985 | Austria | Mar. 25, 1931 |

OTHER REFERENCES

Saunders: "The Aromatic Diazo Compounds," 1951, pages 158, 159, 164.